United States Patent [19]

Yokata

[11] 4,137,171

[45] Jan. 30, 1979

[54] PROCESS FOR TREATING WASTE WATER AND AN APPARATUS THEREFOR

[75] Inventor: Ittshu Yokata, Zentsuji, Japan

[73] Assignee: Ishigaki Kiko Co., Ltd., Tokyo, Japan; a part interest

[21] Appl. No.: 466,718

[22] Filed: May 3, 1974

[51] Int. Cl.$^2$ .............................................. C02C 1/04
[52] U.S. Cl. .................................................. 210/150
[58] Field of Search .................. 210/12, 17, 150, 151, 210/13

[56] References Cited

U.S. PATENT DOCUMENTS

| | | | |
|---|---|---|---|
| 3,112,261 | 11/1963 | Porter et al. | 210/17 |
| 3,335,081 | 8/1967 | El Naggar | 210/150 X |
| 3,402,125 | 9/1968 | Tanaka | 210/17 X |
| 3,466,241 | 9/1969 | Simpson | 210/151 X |
| 3,485,372 | 12/1969 | Nordgard | 210/150 |
| 3,617,541 | 11/1971 | Pan | 210/17 |
| 3,715,304 | 2/1973 | Hefermehl | 210/12 X |
| 3,730,883 | 5/1973 | Lefrancois | 210/12 X |
| 3,745,113 | 7/1973 | Fuchs | 210/12 |
| 3,837,492 | 9/1974 | Di Bello | 210/150 |
| 3,847,811 | 11/1974 | Stengelin | 210/150 |
| 3,878,097 | 4/1975 | Mochizuki et al. | 210/151 |

*Primary Examiner*—Thomas G. Wyse

[57] ABSTRACT

A process for treating waste water such as sewage wherein waste water to be purified is brought successively into contact with a number of net units which are arranged in a treating tank with certain intervals therebetween. Organic substances in the waste water are removed due to decomposition caused by microorganisms which adhere to the net units. In the net units, water being in contact with the individual net units is always replaced, a disturbance is given to the water resulting in easy approach of the organic substances to the microorganisms, contact area between the organic substances and the microorganisms is large, and various kinds of microorganisms propagate. Thus, removal of the organic substances proceeds effectively and promptly. An apparatus which is suitable for carrying out the process is also proposed.

1 Claim, 21 Drawing Figures

PROCESS FOR TREATING WASTE WATER AND AN APPARATUS THEREFOR

This invention relates to a novel and improved process for treating waste water, and more particularly to a process for treating waste water containing organic substances in which process the organic substances are removed due to decomposition of the same by the action of microorganisms. The present invention also relates to a novel apparatus which is suitable for carrying the concerned process into practice.

The treatment of waste water for purifying the same has obtained a great importance with regard to the destruction of environment for the existence of living things, especially with regard to the influence of waste water on marine products industry and agricultural industry, and with regard to the reuse of water. A process for treating waste water which is economical and which permits a high purification of waste water has thus been demanded. As a powerful process which fulfills such demand, there is a process for treating waste water in which contaminations in waste water are decomposed by microorganisms so that the contaminations are removed. That is, when organic substances are contained in waste water and if there are adequate conditions for organic substances as to temperature, nourishment, dissolved oxygen and the like, propagation of aerobic microorganisms is resulted so that the aerobic microorganisms decompose the organic substances into injurious substances such as carbon dioxide, water the like by enzyme reactions and new cells of microorganisms are synthesized by utilizing energy produced by such decomposing reaction, and a process for treating waste water which utilizes such action of aerobic microorganisms is called or termed as "bio-oxidation process." When such bio-oxidation process is carried out, there occurs the auto-oxidation of a part of the organic substances in waste water by using dissolved oxygen in the water so that organic substances are decomposed and removed by the action of microorganisms and also by such auto-oxidation. Further, when dissolved oxygen in concerned waste water has been exhausted by aerobic microorganisms, there occurs propagation of anaerobic microorganisms in place of aerobic microorganisms and such anaerobic microorganisms exhaust oxygen contained in organic substances for the living of the microorganisms and decompose organic substances by various enzymes secreted by the anaerobic microorganisms so that organic substances are finally decomposed into carbon dioxide, methane, hydrogen sulfide, ammonia and the like. A process for treating waste water which utilizes such action of anaerobic microorganisms is called or termed as "anaerobic decomposition."

Among these two kinds of processes for treating waste water which utilizes microorganisms, the bio-oxidation process utilizing aerobic microorganisms is particularly spread. As typical embodical processes for such bio-oxidation process, there are following three processes. The first process is "activated sludge process" in which waste water having been treated in a primary settling tank is recirculated in and through an aeration tank under aeration so that flock-like aerobic microorganisms are propagated in the aeration tank, whereby numerous flocks of the aerobic microorganisms adsorb or biosorb organic substances in waste water which are then decomposed by the aerobic microorganisms in the flocks. In carrying out this activated sludge process, waste water to be treated is stayed in the aeration tank for a suitable period of time and then is released after a settling treatment in a final settling tank and a part of settled or sedimentated sludge in the final settling tank is returned to the aeration tank as activated sludge for supplying aerobic microorganisms to the aeration tank. The second process belonging to the bio-oxidation process is "sprinkling or trickling filter process" in which waste water to be treated is sprinkled onto a filter bed formed with a layer of 2 to 3 meters in height of crushed stone blocks of 2.5 to 8 centimeters in size and treated water is discharged from the bottom of the filter bed. In this case, aerobic microorganisms are propagated in a film-like fashion on the surface of the crushed stone blocks and such aerobic microorganisms decompose organic substances in waste water which come into contact with the films of the microorganisms. In carrying out this sprinkling filter process, a part of treated water which is subjected to a final settling treatment is often recirculated to the filter bed for enhancing BOD (Biochemical Oxygen Demand) loading. The third process belonging to the bio-oxidation process may be called or termed "submerged packing process" in which a fixed layer of various packings are submerged in waste water in a treating tank and waste water is recirculated in the treating tank through the layer of the packings under aeration so that aerobic microorganisms generating on the surface of individual packings as films decompose organic substances coming into contact with the films of the aerobic microorganisms. As packings for this submerged packing process, there have been proposed block-like packings, a bundle of long straight tubes in which a number of long straight tubes each having, for example, hexagonal cross-section, are in parallel arranged so as to make a long bundle of the tubes, packings in the form of bamboo twigs, Raschig ring-like packings which are arranged at random, and the like.

Turning to a consideration of the activated sludge process and the sprinkling filter process, these processes have the following disadvantages, respectively. First, in carrying out the activated sludge process, the flocks of aerobic microorganisms are recirculated in the aeration tank together with the recirculation of waste water with such a rate substantially the same as the flow rate of waste water so that waste water surrounding each flock of the microorganisms is seldom replaced, that means contact between the microorganisms and the contaminating organic substances is poor. Further, in carrying out the activated sludge process, so-called sludge control is very hard. That is, for the purpose of carrying out the activated sludge process with a high efficiency, it is required to control the return rate of activated sludge and the like by watching the sedimentation ability of sludge, mean stay period of time of waste water in the aeration tank, sludge concentration and the like, and this control is termed as sludge control. In practice, this sludge control is made by employing as characteristics or indexes mixed liquor suspended solid concentration, sludge volume index, sludge density index, sludge age and the like. However, these indexes or characteristics can seldom be measured or detected with a reliable manner and also it is not necessarily easy to determine an optimum return rate of activated sludge and the like from a combination of such numerous indexes or characteristics. Referring to the spraying filter process, although this process has an advantage that operation cost is smaller than that of the activated sludge process, the spraying filter process requires a large space and cost for installation of an apparatus for the process and further, in carrying out the process, an offensive odor and insects are generated and loss of water head is large.

Turning to a consideration of the submerged packing process, bio-oxidation is made in this process in such a state that microorganisms are always adhering to the packings so that control corresponding to the sludge control in the activated sludge process is very easy. Further, in carrying out the submerged packing process, concentration of suspended solid in treated water from the treating tank is very small so that said treated water can be discharged immediately without being subjected to a final settling, and it is easy to obtain treated water having low concentration of contaminations by setting the stay period of time of waste water in the treating tank adequately. As factors of demands for carrying out this submerged packing process with a high efficiency, the following may be pointed out. (1) First, water to be treated should flow in the treating tank, especially through the layer of packings, uniformly without the presence of staying portions, that means that waste water coming into contact with the surface of the individual packings is always replaced with a substantially same rate throughout the layer of the packings so that all of the packings always act uniformly and effectively. (2) Second, an adequate turbulency or disturbance should be present in waste water flowing through the layer of the packings so that there exists a condition which is suitable for the propagation of microorganisms. That is, as to the flow of waste water in the layer of the packings, water around the individual packings does not move substantially due to the resistance against flow given by the surface of the packings and viscosity of water resulting in formation of so-called laminar sub-layer, and organic substances which are nourishments for microorganisms diffuse through the laminar sub-layer from the outer flow of said sub-layer to approach to the flock-like microorganisms on the packings so that the microorganisms are nourished resulting in propagation of the microorganisms. Accordingly, when a turbulency or disturbance of flow which is not so strong to scrape off the microorganisms from the surface of the packings is given to the flow of waste water thereby the thickness of laminar sub-layer being reduced, organic substances easily approach to the microorganisms on the packings as nourishment of said microorganisms so that propagation of the microorganisms is enhanced. An adequate turbulency or disturbance of water flowing through the layer of the packings is, therefore, an important factor. (3) Third, there should be a circumstance which permits the existence or generation of various kinds of microorganisms. That is, as well known, one kind of microorganism can exist or generate at a condition and also one kind of microorganism acts as a decomposer of one kind of substance. Accordingly, if there are various conditions at various locations in a layer of the packings, there are generated various kinds of microorganisms which decompose various kinds of contaminating substances. (4) Fourth, there should be large amounts of flocks of microorganisms in the unit volume of the layer of packings so that the microorganisms acting on organic substances in waste water are large in numbers. (5) Fifth, contact area between microorganisms and waste water should be large and should be increased as the microorganisms propagate. (6) Finally, a suitable packed condition in a layer of packings should be able to be set under consideration on contaminated degree of waste water to be treated and desired purification degree of treated water and with setting the height or length of the layer of packings in the direction of flow of waste water suitable under consideration on the decrease of dissolved oxygen which decreases along the direction of flow of waste water.

The submerged packing process according the prior art, however, seldom fulfills these factors or demands due to the foregoing packings so that the process does not achieve a treatment of waste water with a high efficiency. That is, as to block-like packings first, the amounts of area of the packings which can be packed in the unit volume of a layer of the packings are so small that the volume of the layer of the packings is increased resulting in lowering of purifying efficiency and in increasing of space and cost for installation. Further, loss of water head is large in this block-like packings. Second, when Raschig ring-like packings are employed, the packings which are arranged at random orientate perpendicular, diagonally and in parallel to the flow of waste water so that there is no uniformity throughout the layer of the packings resulting in non-uniformity of flow distribution of waster water through the layer of the packings, that means the lack of the aforestated first factor or demand. Further, sludge easily accumulated in the packings which are orientated in parallel to the flow of waste water is apt to putrify. Furthermore, flocks of microorganisms adhering on the inner face of the ring packings reduce the contact area between the microorganisms and waste water as the flocks grow. Third, when packings in the form of bamboo twigs are employed, there is no uniformity in the flow distribution of waste water through a layer of the packings resulting in the lack of the aforestated first factor or demand and further the amounts of microorganisms capable of being held on the surface of the packings are very small so that a treatment with a high efficiency cannot be expected.

Turning to a consideration of the bundle of long straight tubes which has been developed recently, it is hard to uniformify inlet fluid pressure throughout the numerous individual tubes so that flow rates in individual tubes vary to a pretty large extent resulting in some lack of the aforestated first factor or demand. Further, a serious disadvantage of this packing consists in the fact that the flow of waste water through each long straight tube takes so-called Poiseuille flow (a flow in which Poiseuille's law is satisfied) except for the neighborhood of the inlet and outlet of the tube, that means the thickness of laminar sub-layer is large so that there is no turbulency or disturbance of flow which is preferred for the propagation of microorganisms. Furthermore, such Poiseuille flow gives few conditions for the existence of microorganisms so that few kinds of microorganisms may exist or generate resulting in the lack of the aforestated third factor or demand. In addition, flocks of microorganisms adhering on the inner circumference of each straight tube reduce the effective inner diameter or size of the tube as the flocks grow so that contact area between the microorganisms and waste water is reduced.

Although the state of the art regarding the bio-oxidation process is recited in the foregoing, the anaerobic decomposition process has similar problems to be solved because the decomposition itself of organic substances in waste water is achieved by the contact of the organic substances with microorganisms so that contact between the organic substances and anaerobic microorganisms should be enhanced.

Accordingly, a primary object of the present invention is to provide a novel process and apparatus for treating waste water which solves the foregoing problems accompanying the processes according to the prior art and which permits a treatment of waste water with a high efficiency.

Another object of the present invention is to provide a novel apparatus for treating waste water which can be installed compactly and with a low cost.

Still another object of the present invention is to provide a novel process and apparatus for treating waste water which is easy in control in carrying out a treatment of waste water.

Other objects and advantages of the present invention will become more readily apparent as the specification is considered in conjunction with the accompanying drawings, in which:

Figure 1:
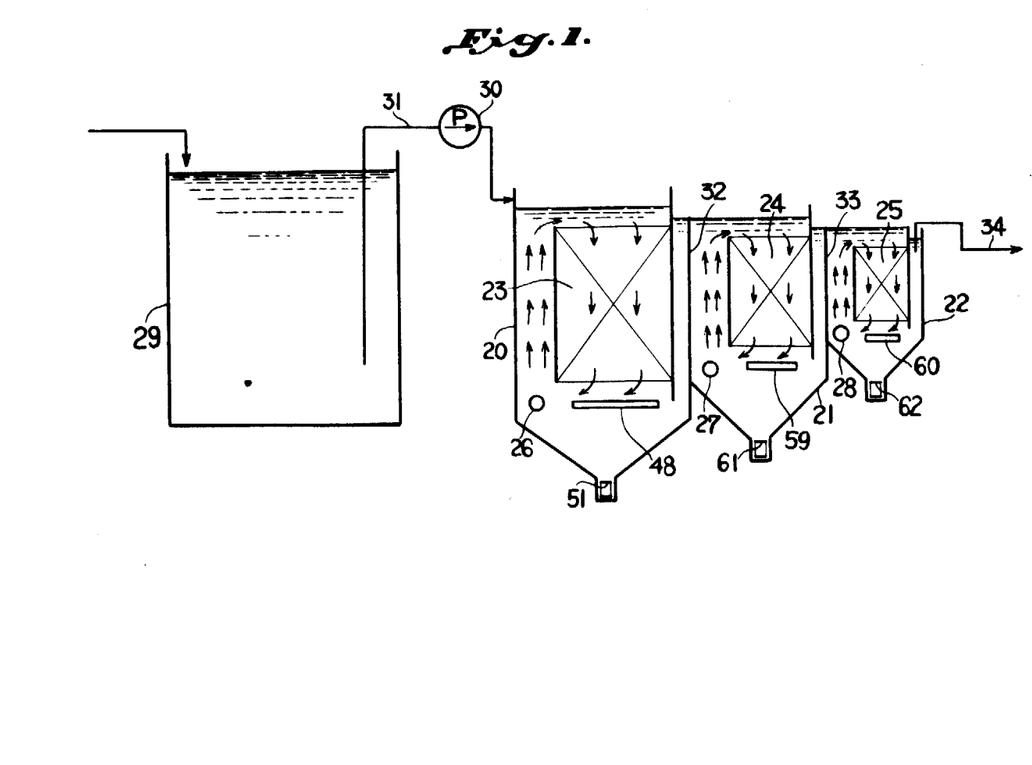
FIG. 1 is a schematic vertical sectional view of an embodiment of the apparatus for treating waste water according to the present invention.

Referring now to the drawings in which like numerals designate like parts throughout the several views thereof, there is shown an embodiment of the apparatus for treating waste water according to the present invention in FIGS. 1 to 7. The apparatus shown is constructed so that it has a relatively low capacity of treating waste water such as sewage. As shown in FIG. 1, the apparatus has three treating tanks, namely first, second and third treating tanks 20, 21 and 22 which are in series arranged. In the treating tanks 20, 21 and 22 are arranged respectively net assemblies 23, 24 and 25 which will fully be detailed later. In the treating tanks are further arranged air-jetting nozzles 26, 27 and 28 which act as aeration means so as to enrich dissolved oxygen in water in the tanks 20, 21 and 22 and also act as recirculating means so as to recirculate water in the tanks along the direction shown with arrows in FIG. 1. A primary settling tank 29 is provided for removing relatively heavier sludge from sewage or the like to be treated by settlement or sedimentation. Water in the settling tank 29 is charged to the first treating tank 20 by a pump 30 through a conduit 31. Water in the first treating tank 20 is then charged to the second treating tank 21 by overflow above a partition 32 between the first tank 20 and the second tank 21. Similarly, water in the second treating tank 21 is then charged to the third treating tank 22 by overflow above a partition 33 between the second tank 21 and the third tank 22. Treated water is discharged from the third treating tank 22 through a conduit 34.

Figure 2:
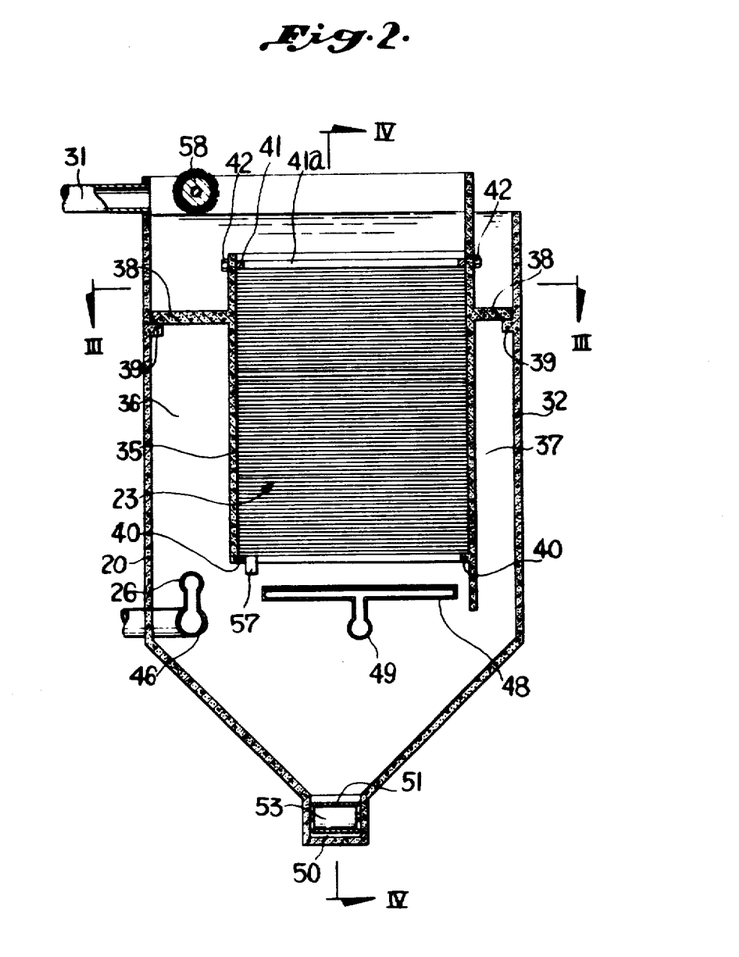
FIG. 2 is an enlarged vertical sectional view of a treating tank employed in the apparatus shown in FIG. 1.
Figure 3:
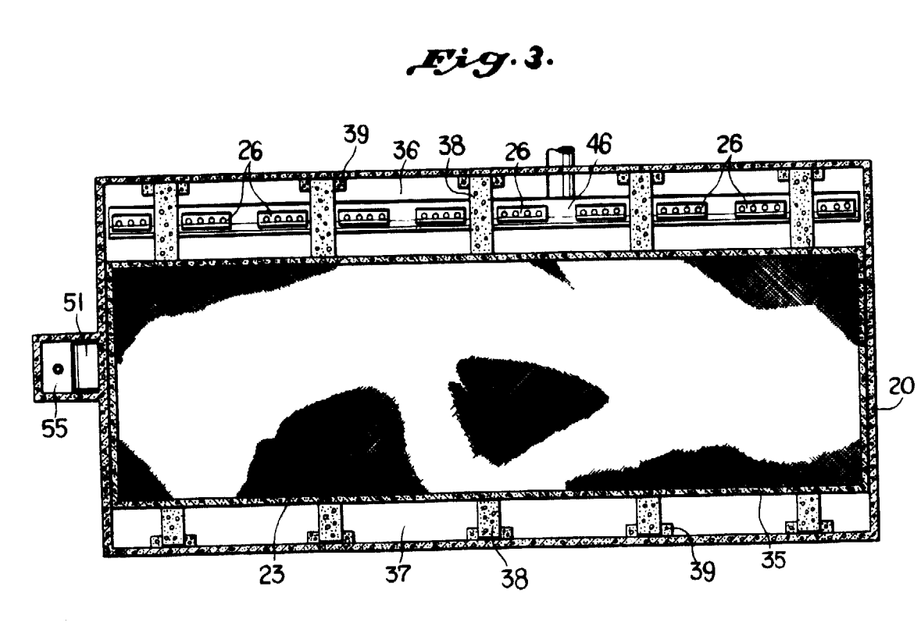
FIG. 3 is a horizontal sectional view of the treating tank taken along line III—III of FIG. 2.
Figure 4:
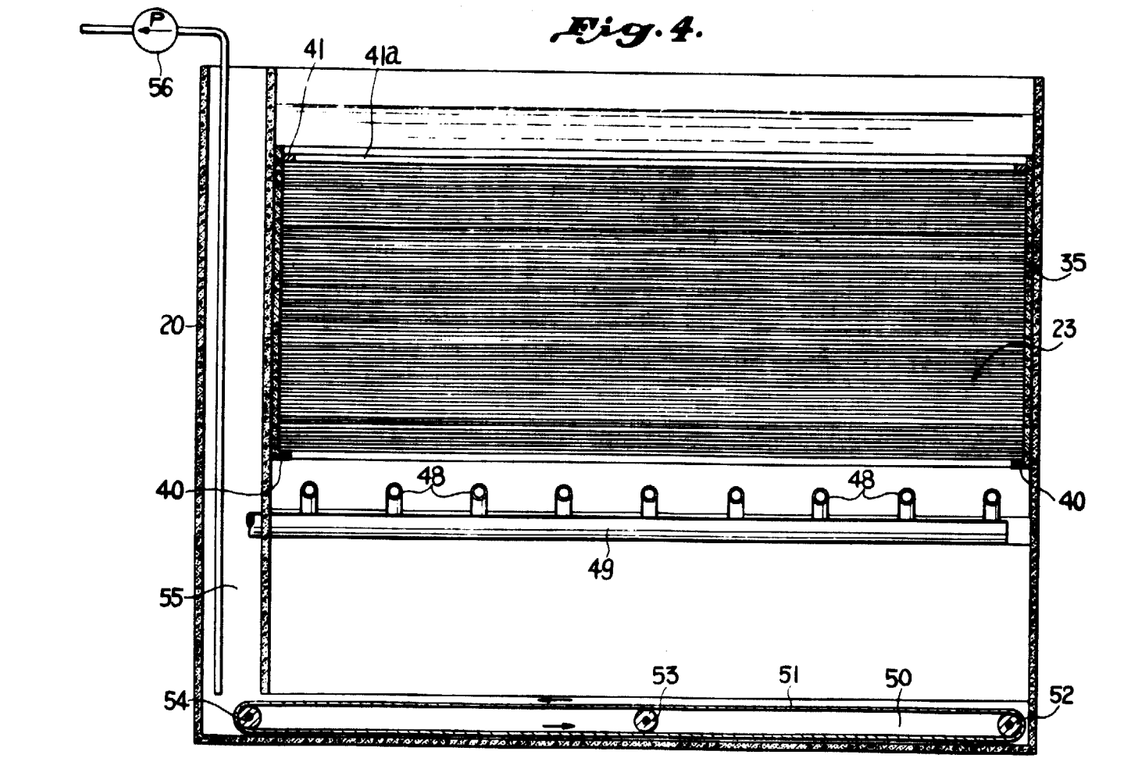
FIG. 4 is a vertical sectional view of the treating tank taken along line IV—IV of FIG. 2.

In the first treating tank 20 of concrete is arranged a frame 35 of concrete having a rectangular cross-section so that a recirculating passage 36 and a discharge passage 37 are formed outside the frame 35 in the tank 20, as shown in FIG. 2. The frame 35 is supported by the tank 20 through supporting arms 38 projected from the frame 35 and supporting stepps 39 formed on the inner walls of the tank 20. The lower end of the frame 35 is projected inwardly so that a receiving step 40 having a rectangular cross-section is formed. As shown in FIGS. 2 to 4, the aforestated net assembly 23 is arranged in the frame 35 so that the assembly 23 is received by the receiving step 40. On the net assembly 23 is placed a retaining means 41 having a rectangular opening 41a which means is secured to the frame 35 at 42.

Figure 5:
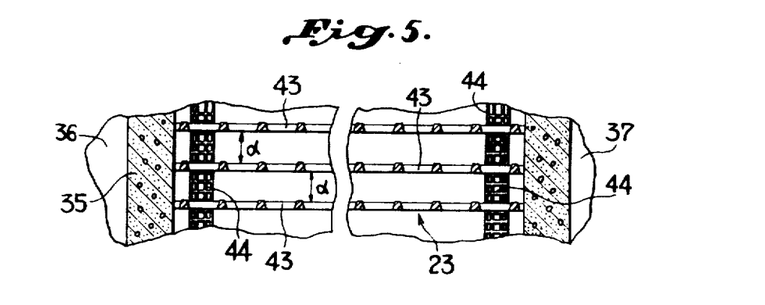
FIG. 5 is an enlarged vertical sectional view, partially cut away, of a part of a net assembly and a frame therefor employed in the treating tank shown in FIG. 2.
Figure 6:
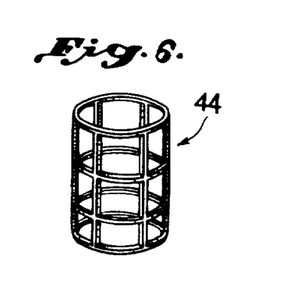
FIG. 6 is an enlarged perspective view of a spacing device employed in the treating tank shown in FIG. 2.
Figure 7:
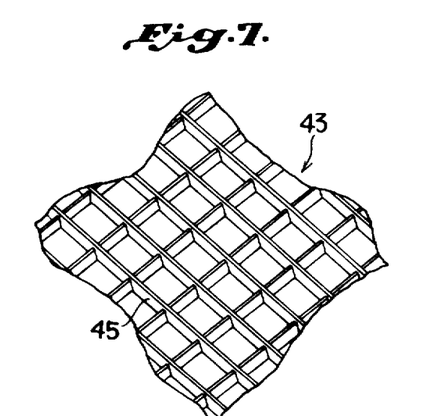
FIG. 7 is an enlarged perspective view of a part of a net unit employed in the net assembly shown in FIG. 5.

As shown in FIG. 5, the net assembly 23 comprises a number of horizontal net units 43 which are in parallel arranged with certain intervals α therebetween. Between two adjacent net units 43 are arranged a plurality of spacing devices 44 of a synthetic resin each of which has a cylindrical network construction as shown in FIG. 6. The spacing devices 44 forming each vertical row may be connected to one another by a wire or the like. Each of the net units 43 is composed of a net 45 shown in FIG. 7 made of a material which has a resistance against hydrolytic decomposition, biological decomposition and corrosion and which is not harmful to the action of microorganisms. An example of such material is a synthetic resin such as polyethylene, polypropylene, polyamide, polyvinyl chloride and the like. A net of such synthetic resin may be prepared by molding. The net 45 has openings or mesh in the form of rhombus or square having a side of, for example, 0.5 to 2 centimeters. The net assembly 23 has a height of, for example, 3 meters and each of the net units 43 has a thickness of, for example, 2 to 5 millimeters. The interval $a$ between each two adjacent net units 43 is, for example, 0.5 to 1.5 centimeters.

The air-jetting nozzles 26 are arranged at the bottom of the recirculating passage 36 with equal intervals therebetween, as shown in FIG. 3. The nozzles 26 are communicated to a common pipe 46 for supplying air and the pipe is in turn connected to a blower (not shown). Below the net assembly 23 are provided a plurality of another air-jetting nozzles 48 communicated to a common supply conduit 49 which is connected to an another blower or a compressor (also not shown). The air-jetting nozzles 48 is intermittently operated so that air is forcedly flowed through the net assembly 23 in the direction reverse to the flow of water for removing sludge from the openings of nets 45.

The bottom of the first treating tank 20 is inclined toward a center groove 50 and an endless conveyor belt 51 is provided in the groove 50 for discharging sludge which sedimentates on the bottom. The conveyor belt 51 is supported by rollers 52, 53 and 54 and is driven to travel by the roller 54 intermittently or continuously in a direction shown with arrows in FIG. 4. The conveyor belt 51 discharges sludge thereon at a discharge chamber 55 beside the tank 20. Sludge in the discharge chamber 55 is discharged intermittently by a discharge pump 56.

As shown in FIG. 2, a flow meter 57 is arranged at the bottom of the net assembly 23 at the side of the recirculating passage 36 for detecting choking or clogging of the net assembly 23 with sludge by sensing the flow rate of water leaving the net assembly 23. The flow meter 57 may be constructed with a fixed contact and a spring-biased movable contact which is forced to move by the kinetic pressure of water so that the meter 52 electrically detects the choking or clogging of the net assembly 23 by the OFF- or ON-state between the contacts. Furthermore, a foam-eliminating means having a brush shaft 58 is provided above the recirculating passage 36. The brush shaft 58 may be stationary or be rotated.

The other treating tanks 21 and 22 are similarly constructed. In FIG. 1, air-jetting nozzles acting similarly as the aforestated air-jetting nozzles 48 in the second and third treating tanks 21 and 22 are designated by numerals 59 and 60 respectively, and conveyor belts acting similarly as the aforestated conveyor belt 51 in the second and third treating tanks 21 and 22 are designated by numerals 61 and 62 respectively.

The apparatus shown in FIGS. 1 to 7 operates as follows: Waste water such as sewage is charged through the conduit 31 into the first treating tank 20. Water treated in the first treating tank 20 is charged by overflow into the second treating tank 21 and water treated in the second treating tank 21 is charged by overflow into the third treating tank 23.

Water charged in the first treating tank 20 is recirculated by the aid of air jetting from the air-jetting nozzles 26 through the tank 20 so that the water passes through the recirculating passage 36 and through the net assembly 23 successively. Simultaneously, dissolved oxygen in waste water is enriched by the air supplied by the air-jetting nozzles 26. Air from the air-jetting nozzles 26 amounts, for example, 3 liters per minute and flow rate of water through the net assembly 23 is, for example, 1 to 4 centimeters per second.

In the net assembly 23, aerobicmicroorganisms existing in waste water adhere onto each net unit 43 or filaments thereof and propagate by uptaking organic substances in the water as nourishment therefor. Flocks of the microorganisms are thus formed on the net units 43. These flocks of the microorganisms further uptake organic substances as the recirculation of water proceeds so that waste water is purified gradually. As will be explained later in great detail, propagation of microorganisms in the net assembly 23 is very vigorous throughout the assembly and flocks of the microorganisms can easily uptake organic substances in waste water so that removal of organic substances from waste water proceeds very vigorously and promptly.

Foams generated above the recirculating passage 36 run against brushes on the brush shaft 58 so that the foams are eliminated easily. Such foams are generated very vigorously when water to be treated contains some amount of detergent. The foam-eliminating means comprising the brush is very simple in construction. Sludge having settled or sedimentated on the bottom of the tank 20 moves along the inclined bottom on the conveyor belt 51 arranged in the groove 50 and is discharged into the discharge chamber 55 by driving the belt 51 intermittently or continuously. Thus discharged sludge is pumped out from the chamber 55 intermittently by the discharge pump 56. Further, when the flow meter 57 detects the choking or clogging of the net assembly 23 by sludge, the supply of air to the pipe 46 communicated to the air-jetting nozzles 26 is stopped and then air is supplied to the pipe 49 so as to jet the air from the air-jetting nozzles 48. In this case, the air flows through the net assembly 23 upwardly so that sludge clogging the assembly 23 is removed. In practise, such choking or clogging of the net assembly 23 is seldom caused.

In each of the second and third treating tanks 21 and 22, a similar operation is obtained. Treated water discharged from the first tank 20 is then treated in the second tank and treated water discharged from the second tank 21 is then treated in the third tank 22. Because water having a low content of contaminations may be treated with a tank having low capacity, the treating tanks of lower reach are made smaller than the treating tanks of upper reach, as shown in FIG. 1.

Figure 8:
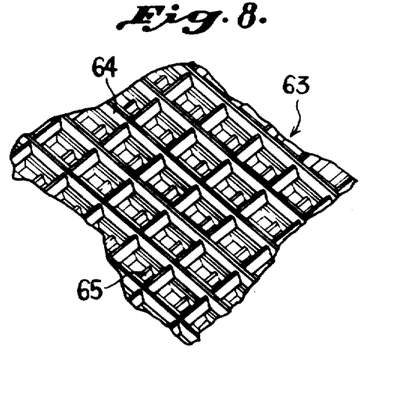
FIG. 8 is a perspective view of another embodiment of a net unit.

In FIG. 8, there is shown an another net unit 63 in which a net 64 having larger mesh or openings and a net 65 having finer mesh or openings are integrated on each other. This net unit 63 gives larger turbulency or disturbance of flow than the net unit 43. The effect of such turbulency of flow will be detailed later. Further, net units each of which is composed of more than two nets may be employed.

Figure 9:
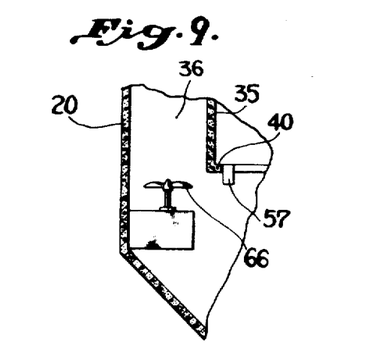
FIG. 9 is a vertical sectional view of a part of another embodiment of a treating tank.

In FIG. 9, there is shown an another embodiment of recirculating means comprising a plurality of propellers 66 which forcedly recirculate waste water in the tank 20. Such separate recirculating means may be provided if required rate of flow or recirculation is not obtained only by the foregoing aeration means 26. Further, when dissolved oxygen is previously enriched in an aeration tank (not shown) arranged before the treating tank 20, the foregoing aeration means 26 may be omitted as shown in FIG. 9.

Figure 10:
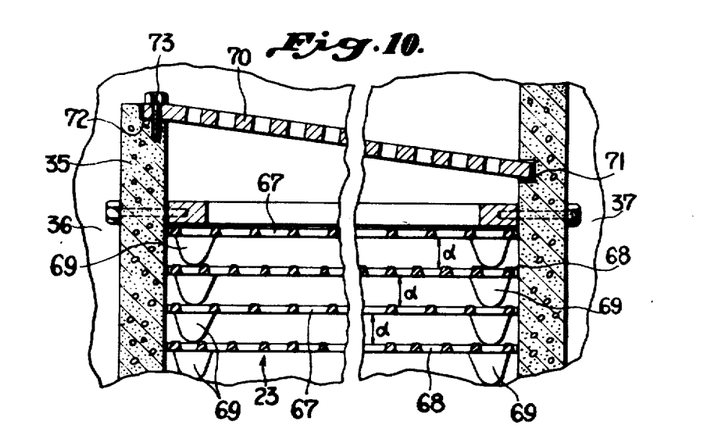
FIG. 10 is a vertical sectional view, partially cut away, of still another embodiment of a treating tank.

In FIG. 10, there is shown an another embodiment of the arrangement of net units. In the embodiment shown in FIG. 10, there are arranged net units 67 each composed of a net having larger mesh or openings and net units 68 each composed of a net having finer mesh or openings. Further, each of the net units 67 and 68 has downwardly projected spacing legs 69 which give the aforestated interval a between each two adjacent units 67 and 68 in place of the aforestated spacing device 44, as shown in FIG. 10. Furthermore, in the embodiment shown in FIG. 10, there is arranged above the net assembly 23 a flow distributor or rectifier 70 in the form of a perforated plate which is supported by a recess 71 on the frame 35 at one end and by a step 72 of the frame 35 and bolts 73 at the other end. In this case, water coming from the recirculating passage 36 to above the distributor 70 is distributed approximately uniformly throughout the cross-section of the frame 35 or the net assembly 23. The flow distributor 70 shown is somewhat inclined for the purpose of avoiding accumulation of sludge on the distributor.

Figure 11:
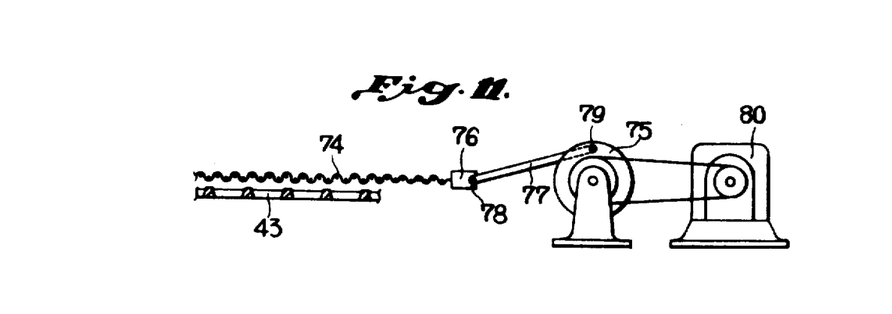
FIG. 11 is a schematic view, partially in section and partially cut away, of an embodiment of a scraping means for removing sludge.

FIG. 11 shows a scraping device which removes sludge from the upper face of the uppermost net unit 43 to which sludge adheres pretty easily. The scraping device comprises a scraping net 74 which is connected to a rotor 75 through a bar 76 fixedly secured to the end of the net 74, an arm 77 bridged between the rotor 75 and the bar 76 and pivot pins 78 and 79 at the ends of the arm 77. The rotor 75 is driven to rotate by a prime-mover 80. Because the pivot pin 79 is placed at an eccentric location of the rotor 75, the scraping net 74 is reciprocated on the net unit 43 as the rotor 75 rotates so that sludge on the upper face of the unit 43 is scraped off. The scraping device is operated intermittently. This construction of the scraping device is simple in construction. Such a scraping device may be provided to the flow distributor 70 shown in FIG. 10.

Figure 12:
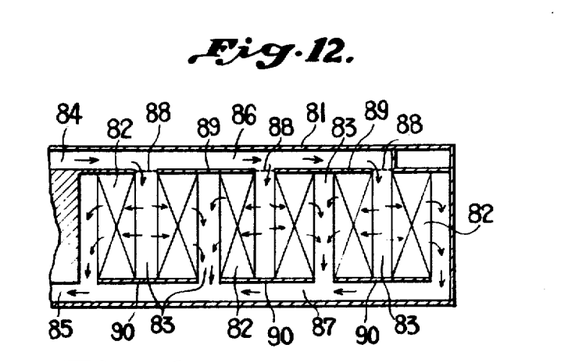
FIG. 12 is a horizontal sectional view of a further embodiment of a treating tank.

In FIG. 12, there is shown an embodiment of a treating tank 81 for a treatment of a large scale. In the tank 81 are arranged a plurality of net assemblies 82 each of which comprises a number of spaced vertical net units (not shown). The net assemblies 82 are in parallel arranged in the tank 81 with remaining a passage 83 between each two adjacent assemblies 82. The treating tank 81 has an inlet 84 for waste water to be treated and an outlet 85 for treated water. A passage 86 for waste water which is communicated to the inlet 84 is provided at one side of the row of the net assemblies 82 and a passage 87 for treated water which is communicated to the outlet 85 is provided at the other side of the row of the net assemblies 82. The passage 86 is communicated to every other passage 83 between two adjacent net assemblies 82 through a flow distributor 88 consisting of a perforated plate. The other passages 83 between two adjacent net assemblies 82 are shut off from the passage 86 for waste water by fixedly provided shutting walls 89. Further, the passage 87 for treated water is communicated to every other passage 83 which is shut off from the passage 86 for waste water. The other passages 83 between two adjacent net assemblies 82 are shut off from the passage 87 for treated water by fixedly provided shutting walls 90.

In the treating tank 81 shown in FIG. 12, water flows in the directions shown with arrows in FIG. 12 and, during such flow, waste water necessarily flows through any of the net assemblies 82 so that treated water is discharged from the outlet 85. The arrangement shown in FIG. 12 permits a compact installation of a plant capable of treating large amounts of waste water. In installing a practical plant, a plurality of similarly constructed treating tanks are connected in series.

Figure 13:
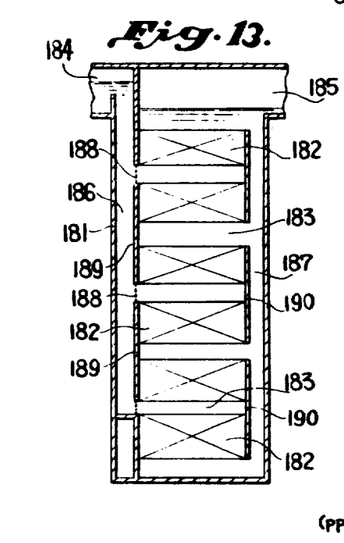
FIG. 13 is a vertical sectional view of still another embodiment of a treating tank.

FIG. 13 shows an another embodiment of a treating tank 181 for a treatment of a large scale. The arrangement shown in FIG. 13 is fashioned so that the horizontal arrangement shown in FIG. 12 is changed into a vertical arrangement. Further explanations on this arrangement shown in FIG. 13 will thus be unnecessary and like parts are designated in FIG. 13 by numerals larger by one hundred than those for the parts shown in FIG. 12.

Although several preferred embodiments are illustrated in the drawings and have been explained hereinbefore, there are many other variations, modifications and extensions. For example, there may be provided heating means for the net assembly. That is, in a season when temperature of water to be treated is low, propagation of microorganisms is not so vigorous, as well known. Accordingly, if the net assembly or the net units therein is heated up to, for example, 25° to 35° C., efficiency of treatment will be enhanced to a great extent owing to a vigorous propagation of the microorganisms. For such purpose, nichrome wires or the like may be embedded in the filaments of the net when the net is molded so that electric current may be supplied through such wires so as to heat the net units when the net assembly is used. Heating of the net assembly or the net units is much more effective than the heating of water itself, because specific heat or heat capacity of water is very large. Further, in place of the detection by the aforestated flow meter 57, a detection of choking or clogging of the net assembly may be made by sensing the difference of water head between the inlet and outlet of a treating tank. Furthermore, in place of the aforestated air-jetting, clogging of the net assembly may be removed by forcedly flowing waste water through the net assembly in a direction reverse to the direction of flow during treatment by a pump, propellers or the like. An another variation is illustrated in FIGS. 18 to 21 and will be detailed later.

Having now explained the process for treating waste water and the apparatus therefor according to the present invention by referring to several embodical features, purification of waste water is achieved in the following manner in the process according to the present invention.

First, as to the flow state of waste water through the net assembly, because individual net units have openings or mesh of approximately equal size and because a certain interval is placed between each two adjacent net units, each net unit plays a role of an uniform flow distributor or rectifier for the next net unit so that approximately uniformly distributed flow is obtained throughout entire cross-section of the net assembly, that means that waste water coming into contact with the surface of filaments of a net or nets composing each net unit is always replaced approximately uniformly throughout the net assembly. All of the flock-like microorganisms on the net units thus always act effectively and uniformly on waste water or organic substances therein. In addition, even if some openings or mesh of a net unit are choked or clogged by sludge, the inlet flow to the next net unit is uniform owing to the presence of an interval between the net units so that there are no staying portions of flow substantially. Accordingly, ratio of the cross-section of the net assembly to the cross-section of non-packing space or recirculating passage can be enlarged without substantial destruction of uniform flowing so that the packed portion or net assembly may be large in a treating tank for enhancing the treatment.

Second, as to the turbulency or disturbance of flow of waste water, the distance of each net mesh along the direction of flow of waste water is very small so that an adequate turbulency of flow is given to waste water at the contact portions with the net units or filaments thereof owing to disturbances due to flowing-in to and flowing-out from the net mesh. The thickness of laminar sub-layer is very small so that organic substances in waste water easily approach to the flock-like microorganisms adhering on the surface of the net unit, whereby the microorganisms uptake the organic substances easily as nourishments resulting in a vigorous propagation of the microorganisms. In addition, such turbulency or disturbance of flow of waste water can easily be set to such extent by setting the flow rate of waste water suitably small so that scraping-off of the microorganisms from the surface of the net units is not caused. That is, in the process according to the present invention, a flow similar to so-called turbulent flow is obtained not by increasing the flow rate of waste water but by a geometrical consideration so that flocks of microorganisms are prevented from scraping-off. Further, as shown in FIG. 14, water around a filament of a net unit passes rapidly at some location and slowly at the other location, that is preferred from a recently proposed theory that there occurs mainly the removal of BOD (Biochemical Oxygen Demand) from water passing rapidly on a flock of aerobic microorganisms due to biosorption and coagulation and there occurs mainly the removal of dissoluble substances from water passing slowly on a flock of aerobic microorganisms due to oxidation.

Figure 14:
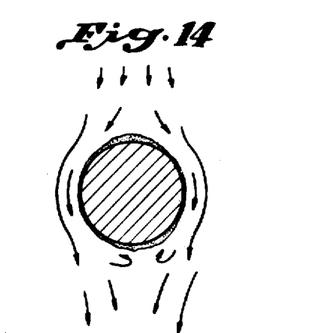
FIG. 14 is an enlarged sectional view of a filament composing a net for the net unit employed in the apparatus according to the present invention showing a flow state around the filament.

Third, such various conditions of flow around a filament of the net unit as shown in FIG. 14 permits existence of various kinds of microorganisms. So, the process according to the present invention permits removal of various kinds of contaminating substances.

Fourth, as to the amounts of microorganism-flocks and contact area between the flocks and waste water, the aforestated vigorous propagation due to flow turbulency and the aforestated uniform distribution of flow of waste water throughout the cross-section of the net assembly cause a very vigorous propagation of microorganisms throughout the net assembly so that there generates on the net units large amounts of microorganisms which in turn increase the effective contact area on the net units, as can be easily understood from FIG. 14. Accordingly, in the process according to the present invention, large amounts of flock-like microorganisms act on organic substances in waste water very effectively.

Finally, a setting of conditions of the apparatus under consideration on a desired treatment can be made easily in designing an embodical apparatus according to the present invention. That is, conditions for a desired treatment can be set by selecting or setting mesh size of each net unit, interval between each two adjacent net units, numbers of nets composing each net unit and the like according to concerned treatment under consideration on the successive decrease of dissolved oxygen along the direction of flow of waste water. For clarifying such setting of conditions, some results of tests will be described hereinafter.

TEST I

Figure 15:
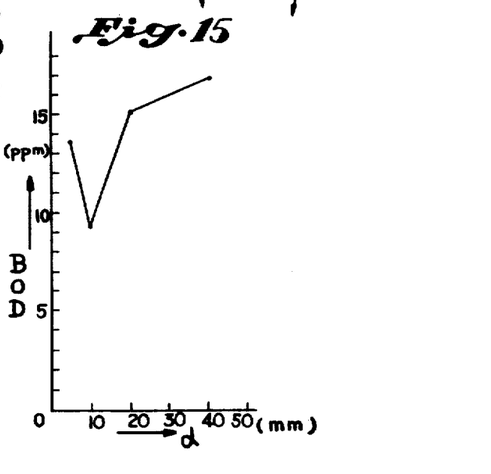
FIG. 15 is a graph showing a relation between the interval α between each two adjacent net units in a net assembly employed in a test plant and BOD in treated water from the test plant.
Figure 16:
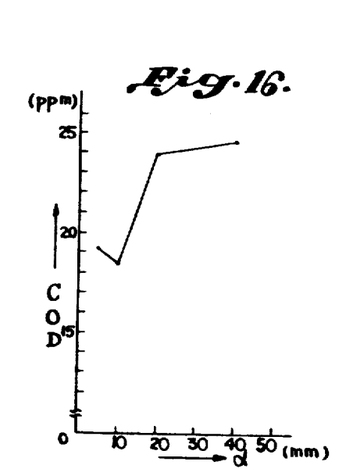
FIG. 16 is a graph showing a relation between the interval α between each two adjacent net units in a net assembly employed in a test plant and BOD in treated water from the test plant.

FIGS. 15 and 16 show the results of tests carried out by means of a test plant. City Sewage of Takamatsu Sewage Treatment Plant, Takamatsu, Japan, was treated. The test plant was constructed similarly to the first treating tank 20 shown in FIGS. 1 to 4. The height of the net assembly was about 1 meter and the cross-section of the net assembly was about 130 square centimeters. Each net unit was composed of integrated two nets of polyethylene having size of 2 mesh and 3 mesh respectively. Quantity of flow of waste water was about 14 liters per hour. Aeration air was supplied with a rate of about 2.8 liters per minute. Temperature of waste water was ranged between 12° and 15° C. Four treating tanks were prepared by changing the interval $a$ between each two adjacent net units in the net assembly in each tank. Tests were carried out for eight days. Treated water from each of the tanks was sampled intermittently and BOD, COD (Chemical Oxygen Demand), content of nitrogen in the form of ammonium ($NH_4^+ - N$) and the like were measured by standard methods of The Japan Sewer Associate. FIG. 15 shows the results of measurement of BOD in the treated water and FIG. 16 shows the result of measurement of COD in the treated water. Each of the marked values in FIGS. 15 and 16 is a mean value of a number of measured values. From FIGS. 15 and 16, it can be seen that the interval $a$ between each two adjacent net units is optimum for the decrease of BOD and the like in the present case when the interval $a$ amounts about 10 millimeters. Content of $NH_4^+ - N$ in the treated water was lowest rather at smaller interval $a$ than 10 millimeters.

TEST II

Figure 17:
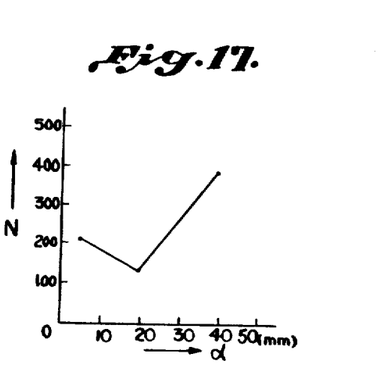
FIG. 17 is a graph showing a relation between the interval α between each two adjacent net units in a net assembly employed in a test plant and the numbers N of Coliform Organisms in the unit volume of treated water from the test plant.

FIG. 17 shows a result of a test carried out by using the treating tanks in TEST I. This test was carried out for examining removal of Coliform Organisms or Coliform group of bacteria. Quantity of flow of city sewage similar to the one treated in TEST I was about 9 liters per hour and aeration air was supplied with a rate of about 3 liters per minute. Temperature of waste water was about 13° C. Numbers of Coliform Organisms in the unit volume of water were measured before the treatment and after the treatment by the Defoxycholate Culture method. The waste water contains about 4300 Coliform Organisms per one milli-liter water. The results of measurement after the treatment are shown in FIG. 17. From FIG. 17 which shows the relation between the interval $a$ and the numbers N of Coliform Organisms in one milli-liter of water, it can be seen that the interval $a$ between each two adjacent net units is optimum for the removal of Coliform Organisms in the present case when the interval amounts to about 20 millimeters.

TEST III

Another test taught that nets in a net assembly having fine mesh is more effective for removing contaminations from waste water to be treated than nets having large mesh. But, when nets with openings having sides smaller than 5 millimeters were used, they were clogged with sludge in sewage by the use for a short period of time.

As can be understood from the foregoing, the process for treating waste water according to the present invention fulfills or satisfies all of the factors or demands (1)

to (6) stated before in relation to the submerged packing process according to the prior art. In addition to this, the process according to the present invention still has the advantages of the submerged packing process according to the prior art. That is, the process according to the present invention requires no complicated control such as the sludge control in the activated sludge process wherein rate of sludge return is determined by watching the state of treatment of waste water so that suitable amounts of sludge are returned to the aeration tank from the final settling tank at suitable points of time. Further, water treated by the process according to the present invention contains little amount of suspended solids so that the treated water can be discharged immediately without subjecting to a final settling. Furthermore, by settling stay period of time of water to be treated in a treating tank according to a required treatment, treated water having a very low concentration of contaminations may be obtained. Of course, no offensive odor or insects generate in carrying out the process according to the present invention.

From tests carried out by using test plants, it has been found that there may exist in treating sewage under a areobic condition various kinds of organisms, namely Schizomycetes such as Zooglea sp.; Ciliates such as Volticella sp., Carchecium sp., Epistylis sp., Aspidisca sp., Litonotus sp., Stenter sp. and Stylonychia sp.; Flagellata such as Monas sp.; Rhizopoda such as Euglypha sp., Arcella sp., Leptochlamys sp. and Difflugia sp.; Rotifers such as Trichocerca sp. and Colurella sp.; Bacillariophyceae such as Melosira sp. and Nitzschia sp.; Nematoda; Oligochaeta and Copepoda.

For the purpose of better understanding of the advantages obtained by the present invention, some results of further tests will be described hereinafter.

TEST IV

Together with the TEST I, a treatment by the submerged packing process wherein a bundle of a number of straight tubes explained before is employed as a packing was carried out. The bundle of straight tubes of polyethylene having a height of about one meter and a cross-section of about 130 square centimeters was arranged in a treating tank in a manner similar to the arrangement of the net assembly in a treating tank according to the present invention. Each tube composing the bundle had a hexagonal cross-section having about 0.7 square centimeters. Quantity of flow of waste water and rate of the supply of areation air were same as the ones for TEST I carried out in the treating tanks according to the present invention. Mean values of measured BOD and COD in treated water from the treatment by the submerged packing process were 22.8 p.p.m. (BOD) and 25.0 p.p.m. (COD) respectively. When these BOD-value and COD-value are compared with corresponding values represented in FIGS. 15 and 16, it can be understood that the process according to the present invention is much more effective than the submerged packing process employing a packing of a bundle of numerous straight tubes.

TEST V

Together with the TEST II, a treatment was carried out according to the submerged packing process wherein the bundle of straight tubes used in TEST IV was employed. Quantity of flow of waste water and rate of the supply of aeration air were same as the ones for TEST II carried out in the treating tanks according to the present invention. Means value of measured numbers of Coliform Organisms in treated water from the treatment by the submerged packing process was 409 per milliliter water. When this value is compared with the values of numbers of Coliform Organisms represented in FIG. 17, it can be understood that the process according to the present invention is much more effective for removing Coliform Organisms than the submerged packing process employing a packing of a bundle of numerous straight tubes.

TEST VI

Tests for examining concentration of suspended solids were carried out by using the treating tanks according to the present invention and used in TEST I and also by using a treating tank in which the bundle of straight tubes used in TEST IV was arranged as a packing. Quantity of flow of city sewage similar to the one treated in TEST I was about 8 liters per hour and rate of the supply of aeration air was about 3 liters per minute. Temperature of the city sewage was about 13° C. The results of the tests are listed in TABLE I.

TABLE I

| Sample | Sewage to be treated | Treated water from No. 1* treating tank | Treated water from No. 2** treating tank | Treated water from No. 3*** treating tank | Treated water from No. 4**** treating tank |
|---|---|---|---|---|---|
| Suspended Solids (p.p.m.) | 36.8 | 5.2 | 2.8 | 0.8 | 8.0 |

*A net assembly having the interval α of 5 millimeters between two adjacent net units was employed.
**A net assembly having the interval α of 20 millimeters between two adjacent net units was employed.
***A net assembly having the interval α of 40 millimeters between two adjacent net units was employed.
****The bundle of straight tubes used in TEST IV was employed.

From TABLE I, it can be seen that concentration of suspended solids is very low in water treated by the process according to the present invention. The process according to the present invention is also superior in this fact to the submerged packing process employing a bundle of a number of straight tubes.

In FIGS. 18 to 21, there is shown an another embodiment of the apparatus for treating waste water according to the present invention. The apparatus shown in FIGS. 18 to 21 comprises a treating tank 100 having an inlet 101 for waste water and an outlet 102 for treated water. The walls of the tank 100 rotatably supports a horizontal shaft 103 which extends through the tank. On the shaft 103 is mounted a hollow shaft 104 which is secured to the former shaft 103 through ring-shaped retainers 116. To the hollow shaft 104 is secured a frame comprising a plurality of ring-shaped frame members 105, which are arranged around the hollow shaft 104 intermittently, and a plurality of ribs 106 which extend radially between the hollow shaft 104 and the frame members 105. The hollow shaft 104, the frame members 105 and the ribs 106 are made from, for example, stainless steel and the ribs 106 are fixedly secured at the ends thereof to the hollow shaft 104 and the members 105 by welding or the like. If required, the surface of the shaft 104, frame members 105 and the ribs 106 coming into contact with waste water in the tank 100 may be coated with a synthetic resin.

Figure 20:
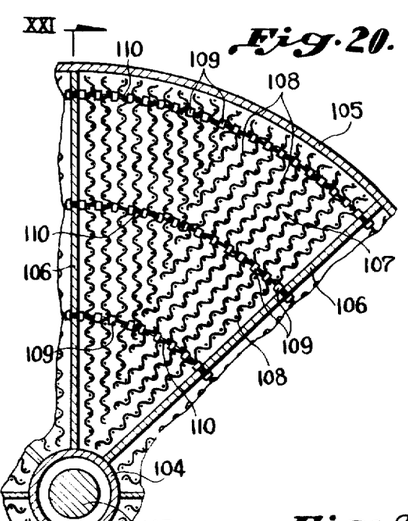
FIG. 20 is an enlarged vertical sectional view of a part of a net assembly and frame therefor employed in the treating tank shown in FIG. 18.
Figure 21:
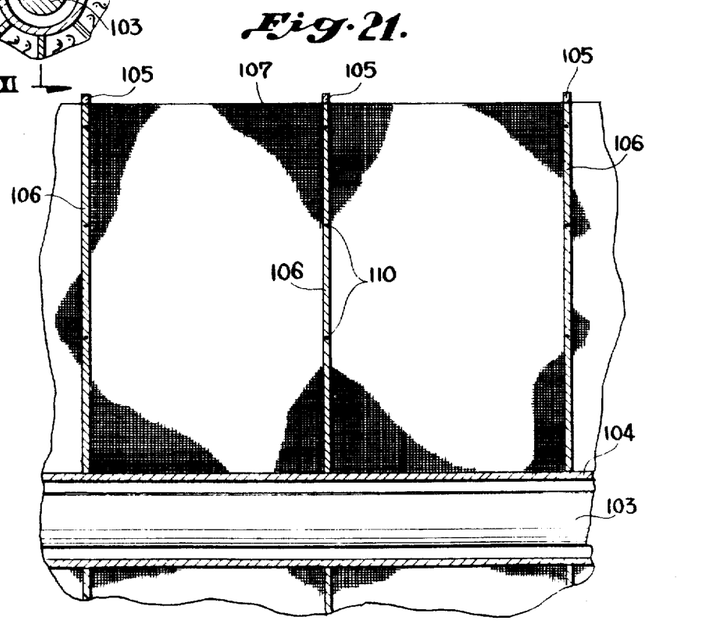
FIG. 21 is a vertical sectional view taken along line XXI—XXI of FIG. 20.

In the frame is arranged a net assembly 107. As shown in FIGS. 20 and 21, the net assembly 107 comprises a number of net units 108 which extend along the hollow shaft 104 through the frame. Between two adjacent net units 108 are arranged spacing devices 109 which are connected to one another and to the ribs 106 by a wire 110 or the like. Further, as shown in FIG. 20, the net units 108 are provided so that there are approximately equal intervals between two adjacent net units along the radial direction throughout the net assembly 107.

Figure 18:
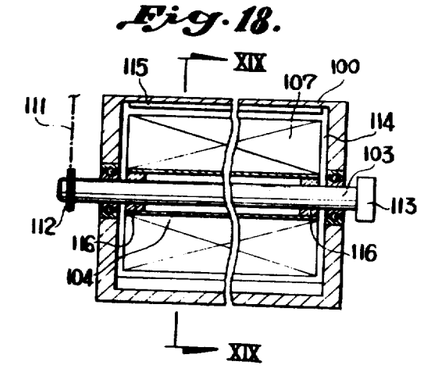
FIG. 18 is a vertical sectional view, partially cut away, of another embodiment of a treating tank.
Figure 19:
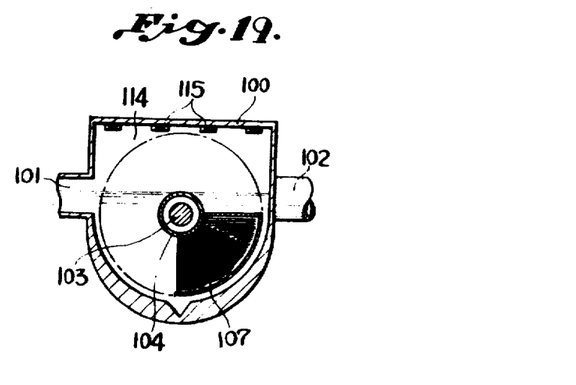
FIG. 19 is a vertical sectional view of the treating tank shown in FIG. 18 taken along line XIX—XIX of FIG. 18.

The shaft 103 is driven to rotate by a prime mover (not shown) through a chain 111 which is trained over a sprocket wheel 112 fixedly mounted on the shaft 103. The prime mover drives the shaft 103 to rotate into one and the other directions. On the shaft 103 is mounted a torque sensor 113 which detects the increase of torque of the shaft 103 so that the clogging of the net assembly 107 or the net units 108 thereof is detected by the increase of the torque.

The outlet 102 is provided at a level such that an aeration chamber 114 is formed above the water level in the treating tank 100. The aeration chamber 114 is provided with a heating means 115 which comprises an electric heater or a conduit for circulating heating fluid so that the air in the chamber 114 may be heated. In place of the heating means 115, previously heated air may directly be circulated through the chamber 114.

When the shaft 103 is rotated with a small rate of rotation, the net assembly 107 is rotated together with the frame therefor in the tank 100 slowly and waste water in the tank comes into contact with the net units 108. During such rotation of the assembly 107 and contact of water with the net units 108, microorganisms propagate by uptaking organic substances in the water and decompose the contaminating substances. Aeration is made in the aeration chamber 114 during the rotation of the net assembly 107. When temperature of the water is low so that propagation of microorganisms is poor, the aeration air is heated by the heating means 115. Further, when the torque sensor 113 detects the clogging of the net assembly 107 by sludge, the shaft 103 is rotated in the reverse direction so that the assembly 107 is rotated reversely, whereby sludge clogging the net assembly is removed.

A rotation-type apparatus such as the one shown in FIGS. 18 to 21 is preferred when viscosity of waste water to be treated is large, because water having a large viscosity lowers water-recirculating efficiency and the efficiency of air-jetting aeration and also often causes the clogging of net assembly. Further, this rotation-type apparatus gives a disturbance or turbulency of water when the net units are submerged into water and derived from water. When the apparatus is constructed so that the net assembly is rotated around a horizontal axis, an aeration chamber such as the foregoing chamber 114 may be provided which omits air-jetting type aeration means and also which makes it easy to heat microorganisms on the net assembly so as to enhance the propagation of the microorganisms.

Having now described the invention and having exemplified the manner in which it can be carried into practice, it is apparent to those skilled in the art that innumerable variations, applications, modifications and extensions of the basic principles involved may be made without departing from the spirit of the present invention. The invention is, therefore, to be limited only by the scope of the appended claims.

What is claimed is:

1. The apparatus for treating waste water comprising at least one treating tank having an inlet for waste water and an outlet for treated water; at least one net assembly which is composed of a plurality of horizontally extending net units arranged in said treating tank in parallel with vertical intervals therebetween of between 5 and 30 millimeters, each of said net units being composed of at least one net having openings therethrough, each of the openings being in the form of polygons having sides of at least five millimeters; and means for moving waste water relative to the net units through said net assembly in the direction perpendicular to the surfaces of the net units at a rate of about one centimeter per second, said means for moving waste water relative to the net units is constructed so that the said means forcedly flows the waste water in said perpendicular direction through said net assembly from the top of the assembly toward the bottom of the assembly, the apparatus further including means for scraping off sludge from the upper surface of the uppermost net unit comprising a net which is intermittently reciprocated to move on and along the upper surface of the uppermost net unit.

* * * * *